April 19, 1927.

D. R. BAILEY

APPARATUS FOR TREATING FOOD PRODUCTS

Filed Aug. 5, 1924   2 Sheets-Sheet 1

INVENTOR
D. R. Bailey
BY
Harry H. Potter
ATTORNEY

April 19, 1927.

D. R. BAILEY

APPARATUS FOR TREATING FOOD PRODUCTS

Filed Aug. 5, 1924 2 Sheets-Sheet 2

1,625,070

INVENTOR
D. R. Bailey
BY
Harry H. Totter
ATTORNEY

Patented Apr. 19, 1927.

1,625,070

UNITED STATES PATENT OFFICE.

DAVID R. BAILEY, OF SACRAMENTO, CALIFORNIA, ASSIGNOR TO CALIFORNIA ALMOND GROWERS EXCHANGE, OF SAN FRANCISCO, CALIFORNIA, A CORPORATION OF CALIFORNIA.

APPARATUS FOR TREATING FOOD PRODUCTS.

Application filed August 5, 1924. Serial No. 730,212.

The present invention relates to an apparatus for treating food products particularly nut meats, as for example, almonds, in carrying out the salting process thereof.

The principal object of the invention is to provide an apparatus wherein the product to be treated is conveyed in a continuous stream flow through a body of material, preferably liquid, for either the scalding, cooking, or coating of the product, and wherein the product is preferably submerged in the liquid during its passage through the apparatus and wherefrom the liquid is permitted to drain prior to the discharge of the product from the apparatus; another object is to provide an apparatus having a conveyor guide wall which serves as a means for assisting in maintaining the product submerged during its travel through the apparatus; a further object is to provide a controlling gate operated by the material conveying means for admitting a predetermined quantity of material to the conveyor at each operation, to preclude the overcrowding of the conveyor and insure an even distribution of the material thereon during its travel through the apparatus.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings forming a part of this application and wherein—

Figure 1:
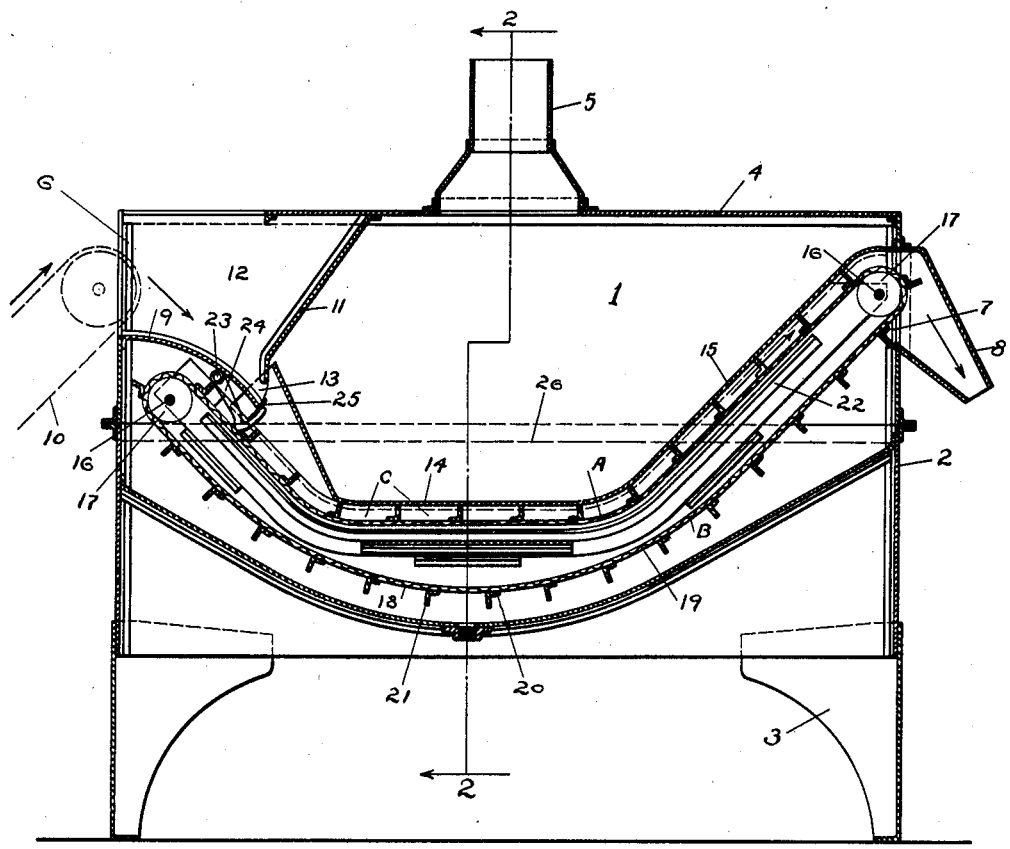
Fig. 1 is a view in vertical longitudinal section of the preferred embodiment of my apparatus.
Figure 2:
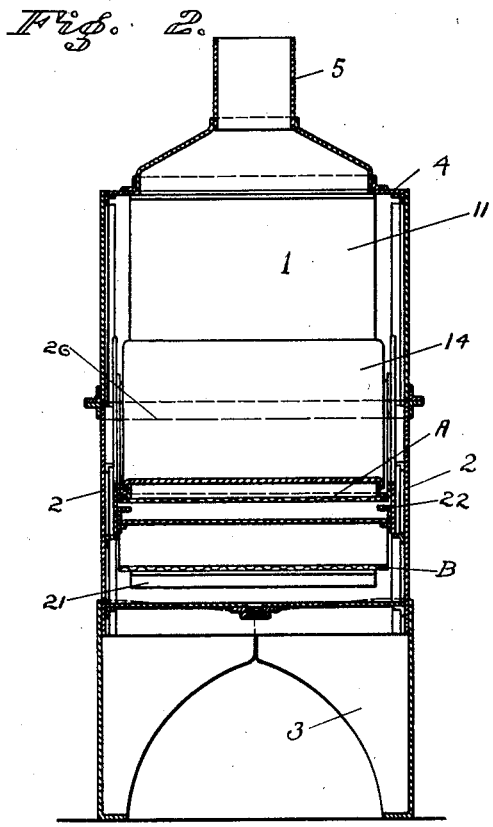
Fig. 2 is a transverse vertical section taken on line 2—2 of Fig. 1, viewed in the direction of the arrow.
Figure 3:
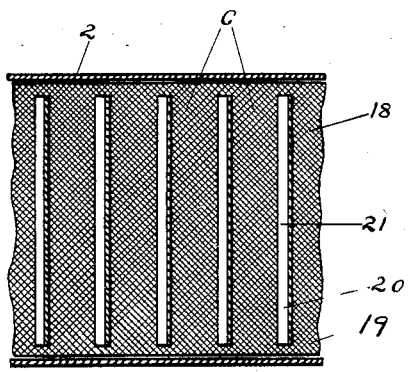
Fig. 3 is a view in detailed plan of a portion of the mesh conveyor.
Figure 4:
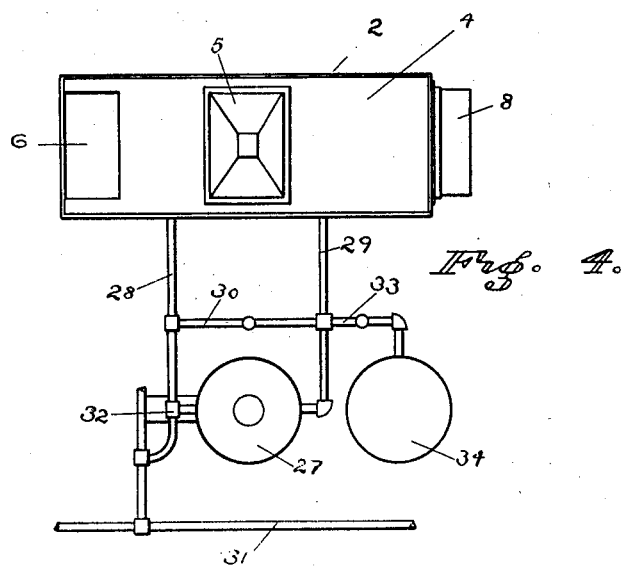
Fig. 4 is a view in top plan of the apparatus with the fruit heating and circulating boiler connected therewith.

In the drawings wherein like characters of reference designate corresponding parts, the numeral 1 indicates a suitable chamber substantially rectangular in plan and consisting of a body portion 2 supported by legs 3 and a removable cover portion 4 upwardly from which extends a stack or outlet 5. The apparatus is provided in the removable cover 4 with a material feed opening 6 and a material discharge opening 7, the latter communicating with the discharge chute 8. A substantially horizontal downwardly curved wall 9 is mounted in the cover, slidably extends into the body portion 2 at one end, and affords a support for the product delivered through the opening 6 by the endless conveyor 10 or other suitable means and a wall 11 disposed transversely of the chamber 1 at a point inwardly from the opening 6 provides a stop wall for the material, the wall 11 being disposed angularly to the wall 9 and the two being arranged with their adjacent ends in spaced relation whereby the walls 9 and 10 provide a storage hopper 12 formed with a discharge throat 13. The wall 11 is mounted in the cover 4 and has the lower end slidably projecting into the body portion. Disposed transversely of the chamber 1 and extending from a point commencing at the end of the plate 11 and terminating at the upper end of the outer wall of the chute 8 is conveyor guide plate 14, also secured in the cover and slidably projecting into the body portion, a portion of which is disposed substantially horizontally in the chamber, the rear end of which is inclined upwardly as at 15 to extend to the upper wall of the discharge opening 7.

Within the chamber are disposed the transverse rotatably mounted shafts 16 carrying the respective conveyor mounting and operating rollers 17, one being positioned beneath the plate 9 in the body portion and the other adjacent the center of the discharge opening 7 and mounted in the cover. Operating over the conveyor supporting rollers 17 is an endless conveyor 18 preferably of open mesh wire cloth, the strands of which intersect as at 19. The rollers 17 divide the conveyor into upper and lower flights A and B and the outer surface of the conveyor carries at spaced points thereon the transversely disposed angle irons 20. The portions 21 of the respective angle irons are disposed at right angles to the outer face of the conveyor, affording between adjacent irons pockets C disposed throughout the entire area of the conveyor. The side walls of the chamber 1 mount suitable tracks 22 disposed beneath the conveyor guide plate 13 and extending in a curved path following substantially the curvature of the plate 9 and plate 14 between conveyor rolls 17. These guide tracks preclude undue sagging of the upper flight A of the conveyor in its movement from the feed to the discharge end of the apparatus.

Fulcrumed on a horizontal axis 23 at a point between one of the rollers 17 and the under surface of the plate 9 are the arms 24 carrying at their free ends a plate 25, serving as a gate to control the passage of material onto the conveyor through the throat 13. It will be observed that the portions 21 of the angle irons 20 in passing beneath the arms 24, act on the same to cause an upward movement of the plate 25 to permit an intermittent flow of material onto the conveyor 19 through the throat 13. It will be observed that the angle irons 20 are positioned a sufficient distance apart on the conveyor to admit of the arms 24 dropping by gravity to move the plate 25 from closed position in the throat prior to the arms being again raised to move the plate into closed position in the throat.

Power is applied to the shaft 16 adjacent the discharge opening 7 to operate the conveyor in the direction of the arrow and it will be observed that as the conveyor moves toward the discharge opening of the apparatus that successive charges of material will be admitted into successive pockets C by the timed opening and closing of the throat 13. The conveyor in its movement with the product to be treated contained within the pockets, passes beneath the guide plate 14 with the free edges of the portions 21 of the angle irons 20 in contact with the under surface of the plate 14', which forms a closure for the otherwise open tops of the pockets and which plate also controls the path of travel of the upper flight of the conveyor.

The fluid within which the food product is submerged, it being preferably water in case of a scalder, oil in the case of a cooker, or gum arabic in the case of coating apparatus, is preferably maintained at a level 26 in the chamber 1 and the same is maintained at the desired temperature by a suitable boiler 27 connected with the chamber through circulating pipes 28 and 29, which are in turn connected in advance of the boiler through a valve controlled pipe 30. Fuel is supplied to the boiler through the pipe 31 and its flow to control the temperature of the boiler is regulated by a thermostatic valve 32, the operation of which is governed by the temperature of the fluid in the return pipe 28 at a point near the boiler 27. With the pipe 29 is connected through a valve controlled pipe 33 a fluid storage reservoir 34, from which fluid is adapted to be admitted into a circulating system as the same evaporates and is absorbed by the food under treatment.

It will be observed that the opposite side edges of the plate 14 at points lie in spaced relation to the inner wall surface of the side walls of the chamber 1, which admits of the steam rising from the heated liquid to pass above the plate 14 and escape through the stack 5.

The cover 4 may be suitably secured onto the body portion 2 by any suitable means engaging the annular flanges at the meeting edges of these ports in the assembled relation of the same as shown in the drawings while the mounting of the curved wall 9, the wall 11 and guide plate 14, in the cover, permit the removal of these parts with the body portion 2, in view of the sliding or loose engaging fit of the parts between the side walls of the body portion, in order that ready access to the several parts of the structure within the housing may be obtained. In the removal of the cover, which removes one of the shafts 16 and the roller 17, carrying one end of the endless conveyor, it will be understood that any means may be provided for withdrawing the shaft 16 or disconnecting ends of the conveyor so that the same may be uncovered to permit the covers to be entirely removed from the machine, in order that the same may be repaired, cleaned, or otherwise handled.

I claim:

1. A processing apparatus comprising a pair of spaced parallel side walls joined by end walls, a bottom secured to the side and end walls and forming a container, a closure for said container, a material inlet and outlet formed in the closure, a guide plate mounted in the closure, said material inlet and guide plate extending downwardly into the container in assembled relation, conveyor supporting means mounted adjacent one end in the container, conveyor supporting and driving means mounted adjacent the opposite end of the container in the closure and an endless conveyor mounted on both the supporting means provided with open ended pockets, said supporting and driving means being operable to drive the conveyor for driving the upper flight toward said means for maintaining a bearing contact between the guide plate and the pockets on said conveyor for maintaining the pockets normally closed.

2. A processing apparatus comprising an open top container, a closure removably mounted on the top of said container, a pair of hopper forming plate members mounted in spaced angular relation in the cover and projecting downwardly into the container, said plate members terminating in adjacent spaced relation at the lower ends to form a discharge into the container, a guide plate mounted in the closure and projecting downwardly into the container, an endless conveyor operable in said container, said conveyor being formed with open ended pockets, the conveyors being operable to retain the upper edges of the pockets on the upper flight of said conveyor in contact with the guide plate for closing the pockets.

3. A processing apparatus comprising an open top container, a closure removably mounted on the top of said container, a pair of hopper forming plate members mounted in spaced angular relation in the cover and projecting downwardly into the container, said plate members terminating in adjacent spaced relation at the lower ends to form a discharge into the container, a guide plate mounted in the closure and projecting downwardly into the container, an endless conveyor operable in said container, said conveyor being formed with open ended pockets, the conveyors being operable to retain the upper edges of the pockets on the upper flight of said conveyor in contact with the guide plate for closing the pockets, and means for closing the discharge opening formed by the plate members, movably mounted in the container and operable by said pockets.

In testimony whereof I have signed my name to this specification.

DAVID R. BAILEY.